3,498,816
FLOCK COATING COMPOSITION
Neil Lamar Finch and Balus Jaffar Holleman, Jr., Kinston, N.C., assignors to E. I. du Pont de Nemours and Company, Wilmington, Del., a corporation of Delaware
No Drawing. Filed Aug. 29, 1967, Ser. No. 663,960
Int. Cl. B32b 5/16
U.S. Cl. 117—17    8 Claims

ABSTRACT OF THE DISCLOSURE

A flock coating composition imparting good conductivity and separability to synthetic flock is exemplified by the composition: (a) a quaternary ammonium compound, e.g., distearyldimethylammonium chloride, (b) urea, (c) a bonding agent, and optionally, (d) a dispersing agent.

BACKGROUND OF THE INVENTION

Field of the invention

The present invention concerns a finish composition for synthetic fibers, particularly a surface-active composition for synthetic flock.

Description of the prior art

The deposition of pile forming short fibers or flock on an adhesively coated fabric backing by electrostatic forces is well known in the art. In preparing such flock, it is desirable that they be easily separable when dispersed in an electrostatic field and also receptive to electrostatic charges.

In the commercial production of synthetic, organic polymeric fibers it is customary to apply a lubricant in order to minimize fiber damage during subsequent mechanical operations. Since most of the synthetic fibers are hydrophobic in nature, it is also common practice to treat such fibers with an anti-static agent in order to prevent the accumulation of static charges. Known finish formulations are blends of compatible lubricating and antistatic agents.

When such blended compositions are applied to fibers intended for use in the preparation of flock and flock fabrics, the results are less than satisfactory because of flocking inefficiency which has now been attributed to poor conductivity of the lubricant and to the tendency of compatible antistats to promote cohesion between flocked particles because of their high viscosity and hydroscopic nature.

A desirable coating composition would, therefore, impart to flock particles good conductivity and separability, which allows them to be easily dispersed in an electrostatic field.

SUMMARY OF THE INVENTION

The invention provides a surface-active composition for synthetic polymeric flock particles which comprises four components: (a) at least 30 parts by weight a quaternary ammonium compound of the general formula

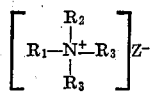

wherein $R_1$ is methyl, $R_2$ is an alkyl group having from 8 to 22 carbon atoms, inclusive, $R_3$ is selected from the group consisting of $R_1$ and $R_2$, and $Z^-$ is a halide ion; (b) 10 to 15 parts by weight of urea; (c) a minor amount of a resinous bonding agent; and optionally, (d) a minor amount of a dispersing agent. Preferable quaternary ammonium salts are cocotrimethylammonium chloride, (hydrogenated tallow)trimethylammonium chloride, distearyldimethylammonium chloride, and mixtures of these three. Preferable composition proportions are about 50 parts of the ammonium compound, about 30 parts of urea, about 10 parts of a bonding agent and about 10 parts of a dispersing agent. All parts expressed are by weight.

DEFINITIONS AND STANDARDS

Percent "siftability" is determined by the following method: A sifting device consisting of a flat, 3-inch diameter, 20-mesh screen circumferentially connected to an annular supporting member is positioned horizontally and 400 milligrams of flock are placed on top of it. The screen is vibrated back and forth at a rate of 370 cycles per cycle is approximately 4 cm. The flock that passes through the screen during a 15-second vibration period is weighed. Percent siftability is this weight in milligrams times 100, divided by 400. Since percent siftability is influenced by the moisture content of the testing environment, results reported herein were obtained in an environment having a constant relative humidity of approximately 65%. Flock particles which adhere to each other, a condition indicative of poor flocking performance, have low percent siftability while flock particles which do not adhere have high values. According to this method, percent siftability values of greater than 40 indicate acceptable flocking performance while values greater than 50 indicate superior performance.

To flock fibers electrostatically, the flock particles must possess a relatively high degree of conductivity. The degree of conductivity is conveniently known by measuring the "resistance" of the flock under the influence of a known electric potential. The following method is used herein: Two thin copper washers, 0.375 inch in diameter, are affixed flat against the bottom of a 1.375-inch long, 1.75-inch diameter, right-circular solid nylon cylinder. The washers are approximately 1.375-inches apart, center-to-center. Each washer is individually electrically connected by means of a copper wire to separate electrodes, 1.75-inches apart, positioned on the cylinder surface approximately 0.125 inch from the top flat surface of the cylinder. The two electrodes are attached to the leads of a Beckman micro-microammeter (commercially available from Beckman Instruments, Inc., Fullerton, Calif.) and the cylinder is placed, washers down, into an aluminum dish containing the dry flock (about 1 gm.) to be tested. The washers contact the flock but do not contact the aluminum. A potential of 210 volts is applied to the electrodes and the current is read from the Beckman dial. Knowing the current and the potential the resistance is calculated by Ohm's law. Resistance as reported herein is the log of the resistance (in ohms) so obtained. For accurate results the cylinder must be kept clean to prevent current flow on the nylon surface between electrodes. Samples of low resistance will exhibit generally good behavior in flocking operations while samples of high resistance behave poorly. According to this method resistance values of less than 12 are indicative of acceptable flocking performance while values of less than 10 are superior. 18-denier-per-filament, 0.18-inch polyamide flock having no finish would have a resistance of approximately 15. High percent siftability and low resistance allow fast fabric production and facilitated flocking operations.

Another test used in the present specification determines the "flocking activity" or the speed of flock projection in an electrostatic field. A laboratory flocking apparatus is used for this test, containing a metal hopper having a screen on the bottom and a brush inside which is positioned to rub against the screen. The hopper is placed 2 inches above a flat aluminum plate measuring 8 inches by 8 inches by 0.125 inch. A charge of 20 kv. is placed between the screen and the plate, and 0.5 grams of flock are placed on the plate. The time, in seconds, it takes for all the fibers to move from the plate to the screen is reported as the activity. For acceptable flocking, the flock should have an activity value of less than 4 seconds. Flock having no finish would have an activity of infinity.

"Flocking efficiency" is determined by placing 10 grams of the same type flock used for determining activity into a flock chamber containing a metal screen which serves as a positive electrode for a 20-kv. DC generator. The chamber is shaken so as to permit the flock to pass through the screen onto a 6 inch x 6 inch thin nonwoven polyester fibrous fabric backing coated with a thin layer of acrylic adhesive ("Heveatex"), placed on a negatively charged ground plate. The flocking operation is carried out for 2 minutes after which time the flocked fabric is weighed and the weight of flock adhered thereto is determined. This weight in grams is reported as flocking efficiency. According to this test, flocking efficiency of greater than 3 grams is indicative of acceptable flocking performance while flocking efficiency of less than 3 grams is considered unacceptable.

Normally the flock fibers employed will have a denier ranging from about 3 to 40. For most purposes a suitable flocking length for the fibers is about 0.5 to 15 millimeters, although for more common uses a length of from about 1 to 9 millimeters is preferred. As is well known, low-denier flock particles should be shorter than higher denier flock particles. The flock fibers may be composed of either linear condensation polymers or linear addition polymers. There may be mentioned, for example, acrylonitrile polymers and copolymers, polyamides such as polyhexamethylene adipamide and polycaproamide, copolyamides, polyesters such as polyethylene terephthalate and copolyesters prepared from glycols, terephthalic acid and isophthalic acid and the like.

EXAMPLE I

Finish-free 18-denier-per-filament, 6,6-nylon flock is prepared by methods well known in the art. The flock fibers are approximately 0.18-inch long and have trilobal cross-sections of the type described in U.S. 2,939,201, dated June 7, 1960. Three finishes are prepared in accordance with the preferred procedure, each composition being a 10% aqueous emulsion and containing the following non-aqueous ingredients in the proportions shown:

Compositon A:
  20% urea
  30% cocotrimethylammonium chloride ("Arquad C" available from Armour Industrial Chem. Co.)
  40% potassium salt of dioctyl phosphate (a dispersing agent)
  10% high-molecular-weight emulsion copolymer containing esters of acrylic and methacrylic acids ("Rhoplex B-85").

Composition B:
  45% urea
  45% distearyldimethylammonium chloride
  10% high-molecular-weight emulsion copolymer containing esters of acrylic and methacrylic acids ("Rhoplex B-85").

Composition C:
  10% urea
  70% distearyldimethylammonium chloride
  20% high-molecular-weight emulsion copolymer containing esters of acrylic and methacrylic acids ("Rhoplex B-85").

The flock is divided into 3 portions and a 1-gram quantity of each portion is individually placed in a separate aluminum cup. The flock in the first cup is covered with Composition A, the second with Composition B, the third with Composition C. The contents of the 3 cups are then separately poured on filter paper and the filter paper containing the finish-coated flock is centrifuged in a laboratory centrifuge for 2 minutes and oven-dried overnight at 65.5° C. The treated flock samples, containing approximately 0.17% finish are tested for siftability and resistance according to the above procedures. Results are as follows:

| Finish composition on flock sample | Siftability, percent | Resistance |
| --- | --- | --- |
| A | 51 | 9.1 |
| B | 50 | 8.8 |
| C | 60 | 8.9 |

EXAMPLE II

A finish-free, 3750-filament/47,000-denier tow consisting of two-component fibers, each component being in intimate lengthwise adherence and in side-by-side relationship is prepared by methods well known in the art. One component comprises a copolymer of 96% acrylonitrile and 4% sodium styrene sulfonate, the other component comprises 85.6% polyacrylonitrile and 14.4% of a copolymer of 96% acrylonitrile and 4% sodium styrene sulfonate. The tow is washed to remove process finish and heated under tension to render the constituent filaments temporarily free of crimp or waviness. The tow is divided into two portions. The first portion is passed through a bath containing a 2% aqueous emulsion of Finish Composition B of Example I and is subsequently dried at 180° C. The fibers of the first portion contain approximately 0.9% solid ingredients of Composition B. The second portion is passed through a bath containing a 2% aqueous emulsion of Finish Composition D which consists of 10 parts urea, 68 parts distearyldimethylammonium chloride, 20 parts of a high-molecular-weight emulsion copolymer of esters of acrylic and methacrylic acids and functionalities adapting it to be thermoset ("Rhoplex AC 201"), and 2 parts of the reaction product of 1 mole nonylphenol and 9 moles ethylene oxide and is subsequently dried at 180° C. The fibers of the second portion contain approximately 0.9% solid ingredients of Finish Composition D. Each treated portion is cut to flock of 4.9±1 millimeter length and tested for activity and flocking efficiency in accordance with methods described above. Results are as follows:

| Finish composition on flock sample | Activity, (sec.) | Flocking efficiency (gms.) |
| --- | --- | --- |
| B | 1-2 | 4 |
| D | 1-2 | 3.7 |

For comparison, the example is repeated with the exception that the finish composition contains no urea and no bonding agent and consists of 40 parts cocotrimethylammonium chloride, 40 parts (hydrogenated tallow) trimethylammonium chloride ("Arquad HT," available from Armour Industrial Chemical Co.), and 20 parts of the reaction product of 1 mole stearylamine with 2 moles of ethylene oxide. The treated flock contains approximately 0.9% solid finish ingredients. Activity is 5 seconds and flocking efficiency is only 2 grams.

DESCRIPTION OF PREFERRED EMBODIMENTS

The new finish composition may be applied, as by padding, dipping and the like, to tow before it is cut to flock or it may be applied directly to the flock. The finish is preferably applied as an aqueous emulsion of from approximately 0.5 to 20% concentration (preferably 5%) of non-aqueous ingredients. For suitable electrostatic flocking the flock particles may contain the new finishes in an amount of from approximately 0.1 to 0.5% and preferably 0.2% non-aqueous constituents, by weight of the flock particles.

A suitable water emulsion of the new finish composition may be made conveniently by admixing approximately 0.5 to 20 parts of non-aqueous finish ingredients into 99.5 to 80 parts water in a suitable vessel. The water emulsion is preferably prepared by admixing from 30 to 70, and preferably 50, parts of the quaternary ammonium salt and from 10 to 50, preferably 30, parts of urea into a vessel containing water at a temperature of approximately 80° C. The mixture is then allowed to cool to approximately 20° C. The bonding agent as a 20–50% aqueous dispersion and, optionally the dispersing agent, are then added to the emulsion which is stirred for about one minute.

When propelling the fibers to a backing by electrostatic means, the treated flock is distributed by means of a shaking device from a bin over a grid electrode charged with from 10,000 to 100,000 volts. At some distance (about 5 to 15 cm., depending on the voltage level) below the grid there is a metal plate connected to the oppositely charged terminal of the high-voltage supply, on which rests a backing material covered with a thin adhesive layer. The charged flock is projected toward the ground and impinges upon the adhesive surface in a direction which is generally perpendicular to the backing material. Using this procedure it is possible to make pile fabrics having pile densities as high as 10 pounds per cubic foot and as low as 1 pound per cubic foot.

Any suitable backing material may be used as the base or substrate for receiving the propelled flock fibers, e.g., a woven, knitted, or non-woven fabric or a film such as polyester film. The backing material is coated with a thin layer of any suitable adhesive which will remain at least tacky during the flocking operation and which can be solidified after propelling the flock fibers to the backing. The adhesives may be solidified by cooling or air drying, or the adhesive may be selected to be a thermosetting adhesive in which case it may be cured to a solid condition by heat and/or catalysts. Typical adhesives include solutions or dispersions of rubber latex, polyvinyl acetate, polyurethanes, polyacrylics, etc.

Useful bonding agents for the present finish composition comprise high-molecular-weight emulsion copolymers containing esters of acrylic and methacrylic acids and which may contain functionalities adapting them to be thermoset, and compatible aliphatic straight-chain hydrocarbon resins. e.g., "Piccopale," trademark of Pennsylvania Industrial Chemical Corp., produced from unsaturated hydrocarbons by their polymerization to nonpolar molecules containing little unsaturation. It is surprising that these agents, which are customarily used as adhesives, do not promote cohesion of the flock particles but actually promote particle separation in an electrostatic field.

Useful dispersing agents which may be used in the new finishes comprise non-ionic emulsifying agents, particularly the reaction product of one mole of nonyl phenol with 9 moles of ethylene oxide, and the reaction product of one mole of stearylamine with 2 moles of ethylene oxide.

Although only three quaternary ammonium compounds are illustrated herein in the new composition, other quaternaries of the same general formula, i.e., having one or two alkyl groups of from 8 to 22 carbon atoms each, bonded to the nitrogen atom, are considered within the spirit and scope of the present invention.

STATEMENT OF UTILITY

Flocked fabrics prepared according to the present invention have use as carpets, paint rollers, interliners for garments, blankets, upholstery fabrics and various laminated multi-layer fabrics.

What is claimed is:

1. In an electrostatic flock deposition process the improvement comprising coating the flock to be deposited with a surface-active finish composition, said finish composition comprising (a) at least 30 parts by weight of a quaternary ammonium compound of the general formula

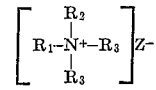

wherein $R_1$ is methyl, $R_2$ is an alkyly group having from 8 to 22 carbon atoms, inclusive, $R_2$ is selected from the group consisting of $R_1$ and $R_2$, and $Z^-$ is a halide ion, (b) 10 to 50 parts by weight of urea, and (c) a minor amount of a resinous bonding agent selected from the group consisting of high-molecular-weight emulsion copolymers containing esters of acrylic and methacrylic acids and aliphatic straight-chain hydrocarbon resins.

2. The process of claim 1 wherein said finish composition contains a minor amount of a dispersing agent.

3. The process of claim 1 wherein $Z^-$ is chlorine.

4. The process of claim 3 wherein the quaternary ammonium compound is selected from the group consisting of cocotrimethylammonium chloride (hydrogenated tallow), triethylammonium chloride, distearyldimethylammonium chloride, and mixtures thereof.

5. The process of claim 4 wherein said finish composition comprises about 50 parts by weight of the said quaternary ammonium compound, about 30 parts by weight of urea, about 10 parts by weight of a resinous bonding agent and about 10 parts by weight of a dispersing agent.

6. The process of claim 4 wherein said coating is carried out by treating said flock with an aqueous emulsion of said finish composition.

7. The process of claim 4 wherein said coating is with 0.1 to 0.5% by weight of said finish composition.

8. The process of claim 4 wherein said coating is with about 0.2% by weight of said finish composition.

References Cited
UNITED STATES PATENTS 3,351,483   11/1967   Miner et al. _____ 117—139.5
3,178,366   8/1965   Du Brow et al.
2,668,785   2/1954   Jefferson et al. ____ 117—139.5

MURRAY TILLMAN, Primary Examiner

H. ROBERTS, Assistant Examiner

U.S. Cl. X.R.

117—27, 100; 260—29.6, 29.7